United States Patent
Hitomi

(10) Patent No.: US 10,444,738 B2
(45) Date of Patent: Oct. 15, 2019

(54) INFORMATION PROCESSOR

(71) Applicant: FANUC CORPORATION, Yamanashi (JP)

(72) Inventor: Ryuuta Hitomi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/712,196

(22) Filed: Sep. 22, 2017

(65) Prior Publication Data

US 2018/0095452 A1    Apr. 5, 2018

(30) Foreign Application Priority Data

Sep. 30, 2016 (JP) ................................ 2016-193077

(51) Int. Cl.
*G05B 19/4155* (2006.01)
*G05B 19/418* (2006.01)

(52) U.S. Cl.
CPC ... *G05B 19/4155* (2013.01); *G05B 19/41835* (2013.01); *G05B 2219/31405* (2013.01); *Y02P 90/12* (2015.11)

(58) Field of Classification Search
CPC .................. G05B 19/4155; G05B 2219/31405
See application file for complete search history.

(56) References Cited

U.S. PATENT DOCUMENTS

| | | | | |
|---|---|---|---|---|
| 2003/0125828 A1* | 7/2003 | Corey | ................. | G05B 19/409 700/186 |
| 2003/0195642 A1* | 10/2003 | Ragnini | ............... | G05B 19/409 700/56 |
| 2007/0185608 A1* | 8/2007 | Ragnini | ............... | G05B 19/409 700/180 |
| 2008/0086724 A1 | 4/2008 | Ogata et al. | | |
| 2009/0222911 A1* | 9/2009 | Chen | .................... | G05B 19/409 726/19 |
| 2016/0306344 A1* | 10/2016 | Hitomi | ............... | G05B 19/4155 |
| 2017/0285614 A1 | 10/2017 | Kawai et al. | | |

FOREIGN PATENT DOCUMENTS

| | | |
|---|---|---|
| JP | H8-95794 A | 4/1996 |
| JP | H11-110029 A | 4/1999 |
| JP | 2002-123394 A | 4/2002 |
| JP | 2004-145641 A | 5/2004 |
| JP | 2008-97103 A | 4/2008 |
| WO | 2016/051545 A1 | 4/2016 |

OTHER PUBLICATIONS

Office Action in JP Application No. 2016-193077, dated Oct. 23, 2018, 4pp.

* cited by examiner

*Primary Examiner* — Charles R Kasenge
(74) *Attorney, Agent, or Firm* — Hauptman Ham, LLP

(57) ABSTRACT

An information processor creates and records execution history information of programs executed by numerical controllers according to information about the programs. The information processor records information (favorite information) about a program corresponding to a favorite condition among the programs, and classifies the recorded favorite information according to the contents of the corresponding program. The information processor transfers the recorded favorite information to a numerical controller according to the classified result in response to a request of the corresponding numerical controller.

6 Claims, 12 Drawing Sheets

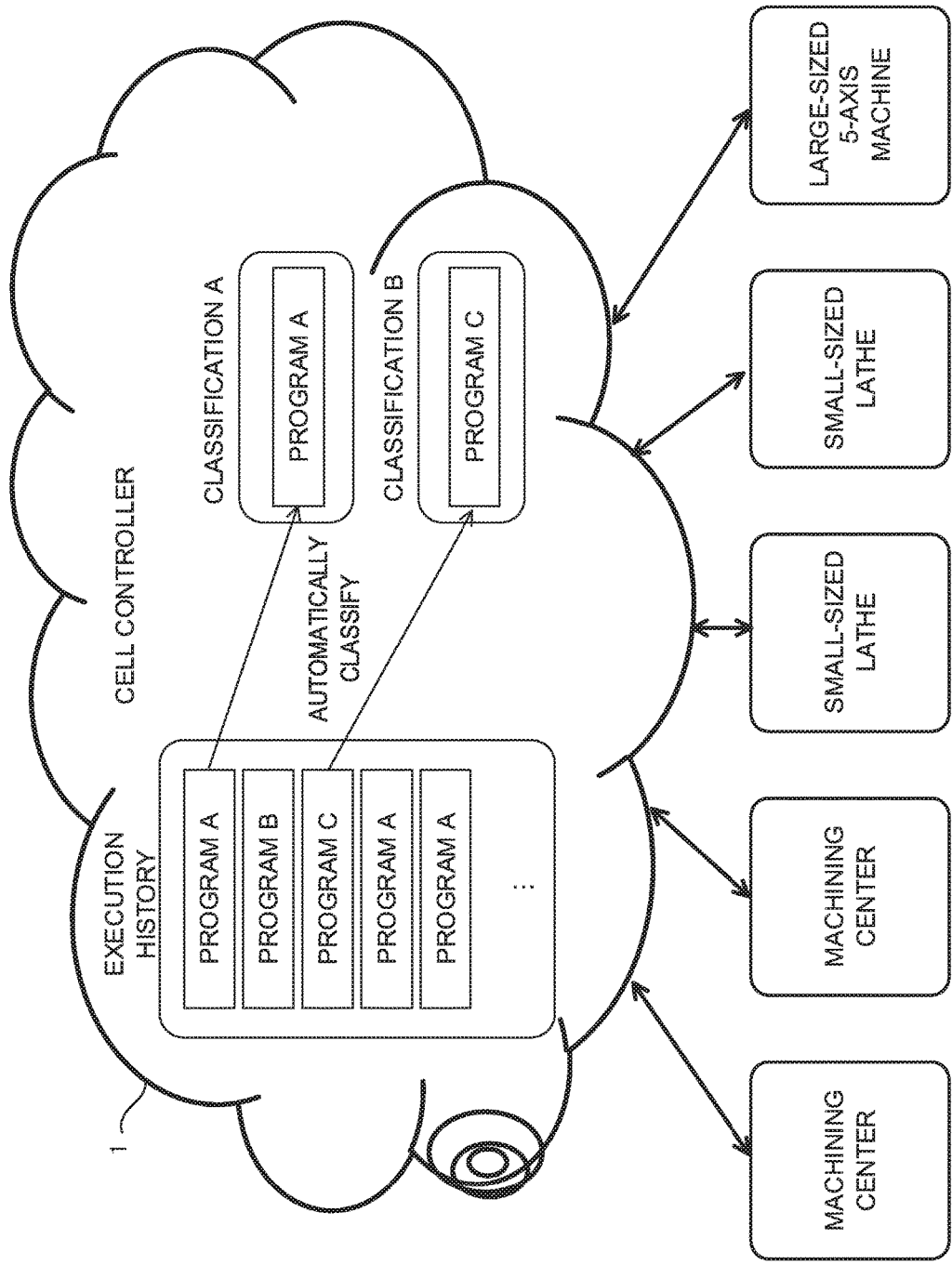

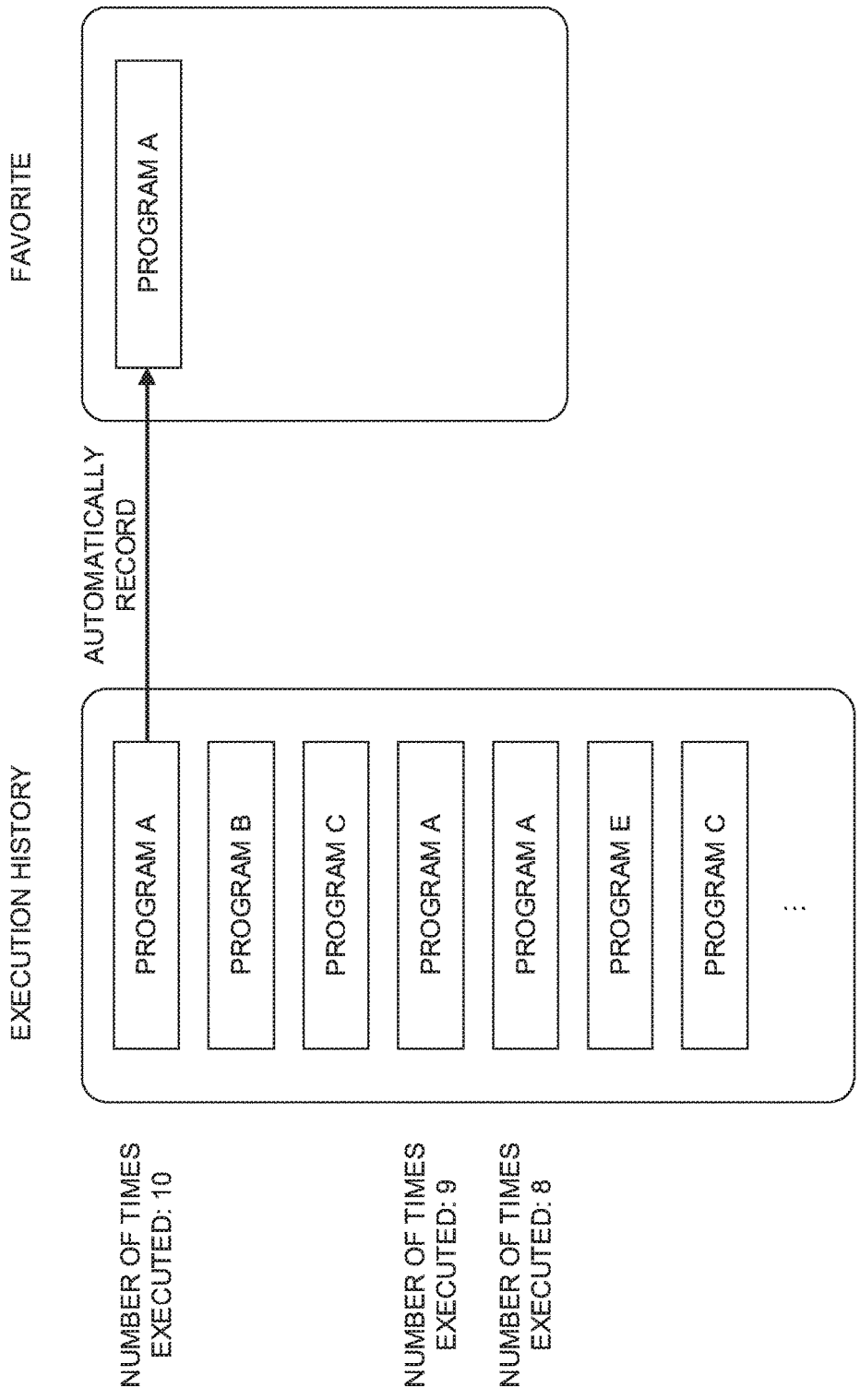

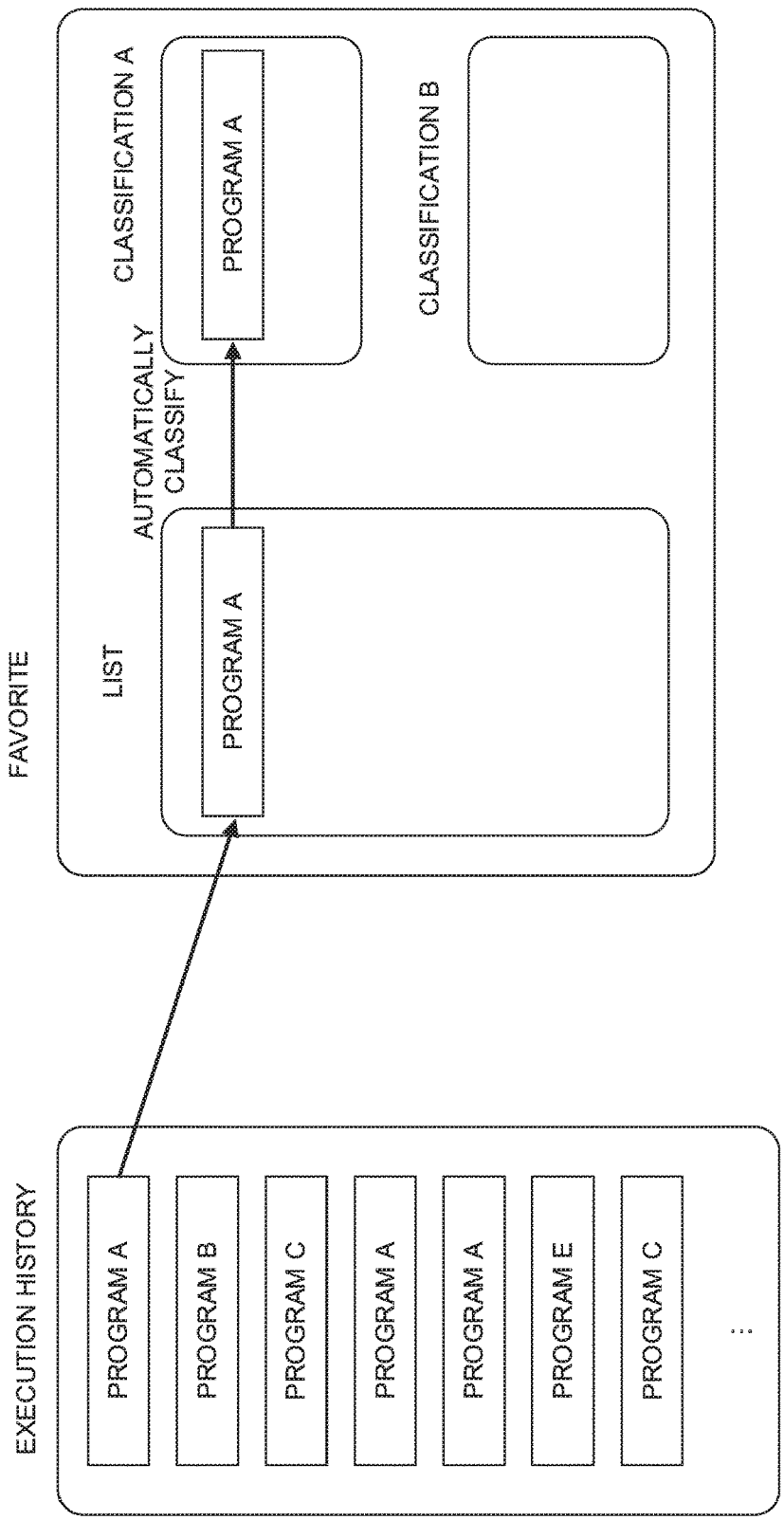

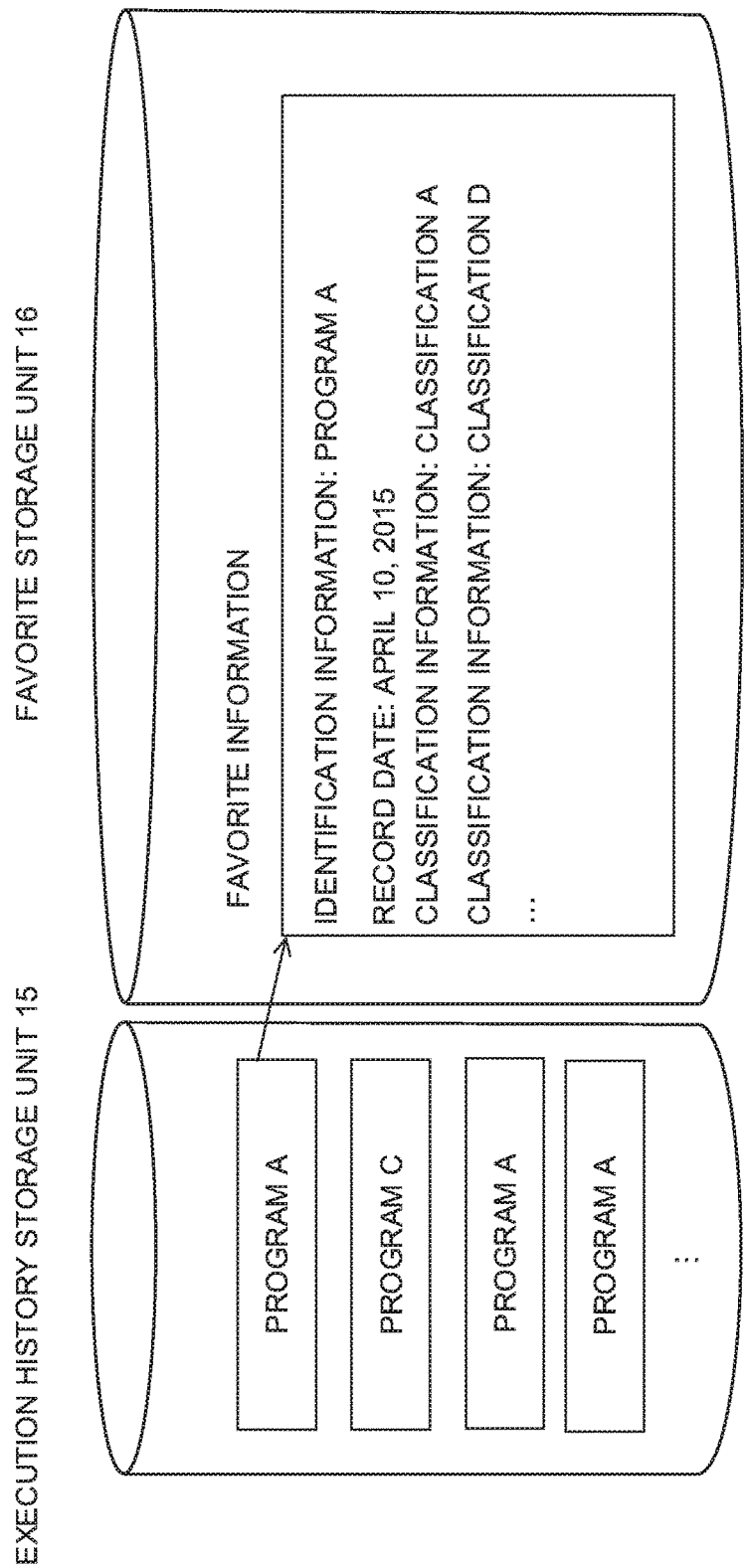

FIG.7

CLASSIFICATION TABLE 17

| CLASSIFICATION CONTENT | CLASSIFICATION CODE |
|---|---|
| PREPARATION FUNCTION | G CODE |
| SPINDLE FUNCTION | S CODE, M03, M04, M05 |
| FEED RATE | F CODE |
| TOOL LENGTH; DIAMETER COMPENSATION | H CODE, D CODE |
| M CODE TYPICAL OF MACHINE | M CODE OTHER THAN M00, M01, M02, M30, M98, M99, M198 |
| POSITIONING COMMAND | G00, G01, G02, G03 |
| REFERENCE POINT RETURN | G28, G30, G30.1 |
| MODAL CANCEL | G11, G13.1, G15, G23, G25, G40, G40.1, G49, G49.9, G50, G50.1, G50.2, G67, G69, G69.1, G80, G80.4, G80.5, G97, G113, G160 |
| COORDINATE SELECTION | G52 — G59, G54.4 |
| EACH CYCLE TYPE | OMITTED |
| CUSTOM MACRO, SUBPROGRAM CALL | G65, M98 |
| TOOL EXCHANGE | M06 |
| COOLANT ON/OFF | M08, M09 |
| SPINDLE ORIENTATION | M19 |
| PALETTE EXCHANGE | M60 |

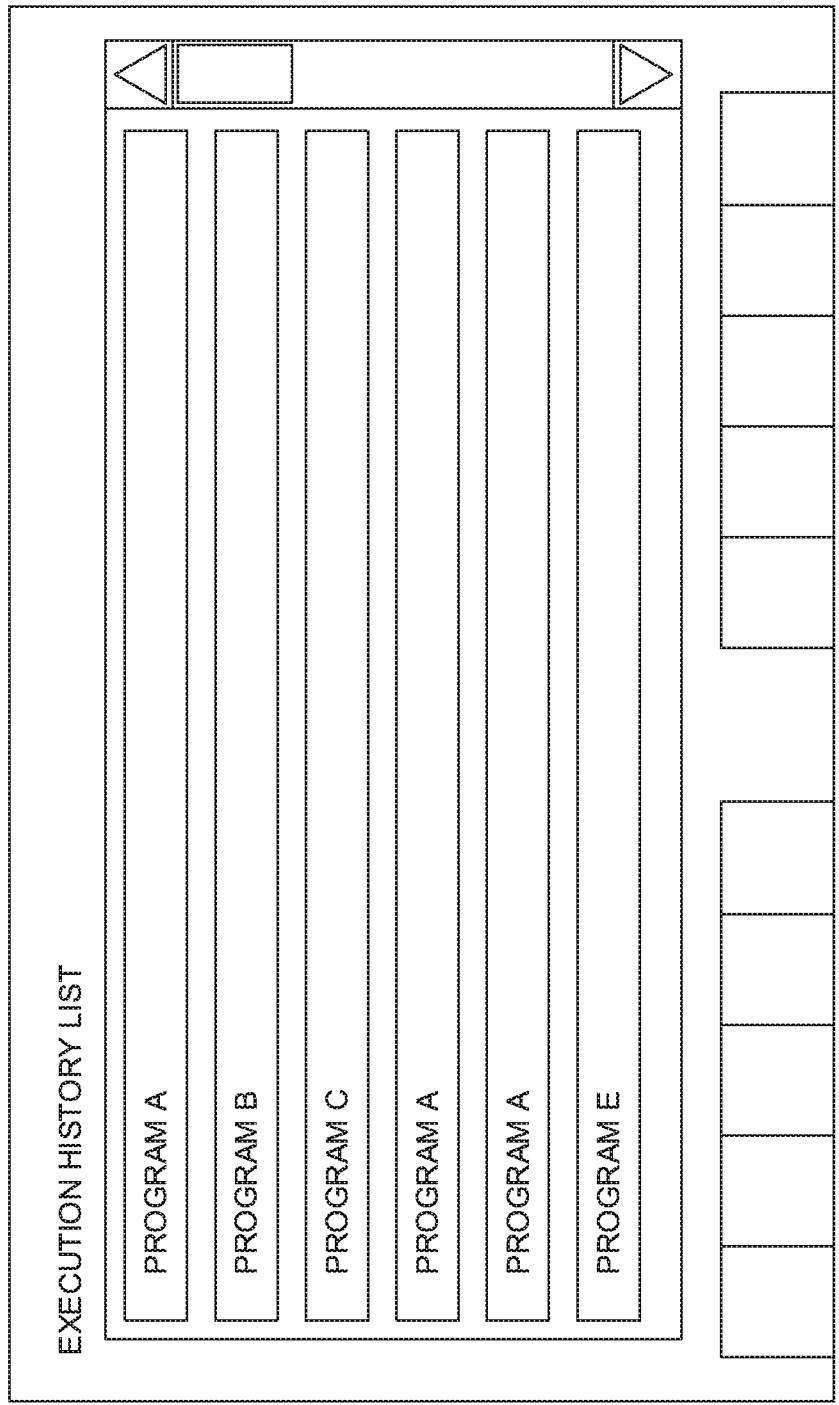

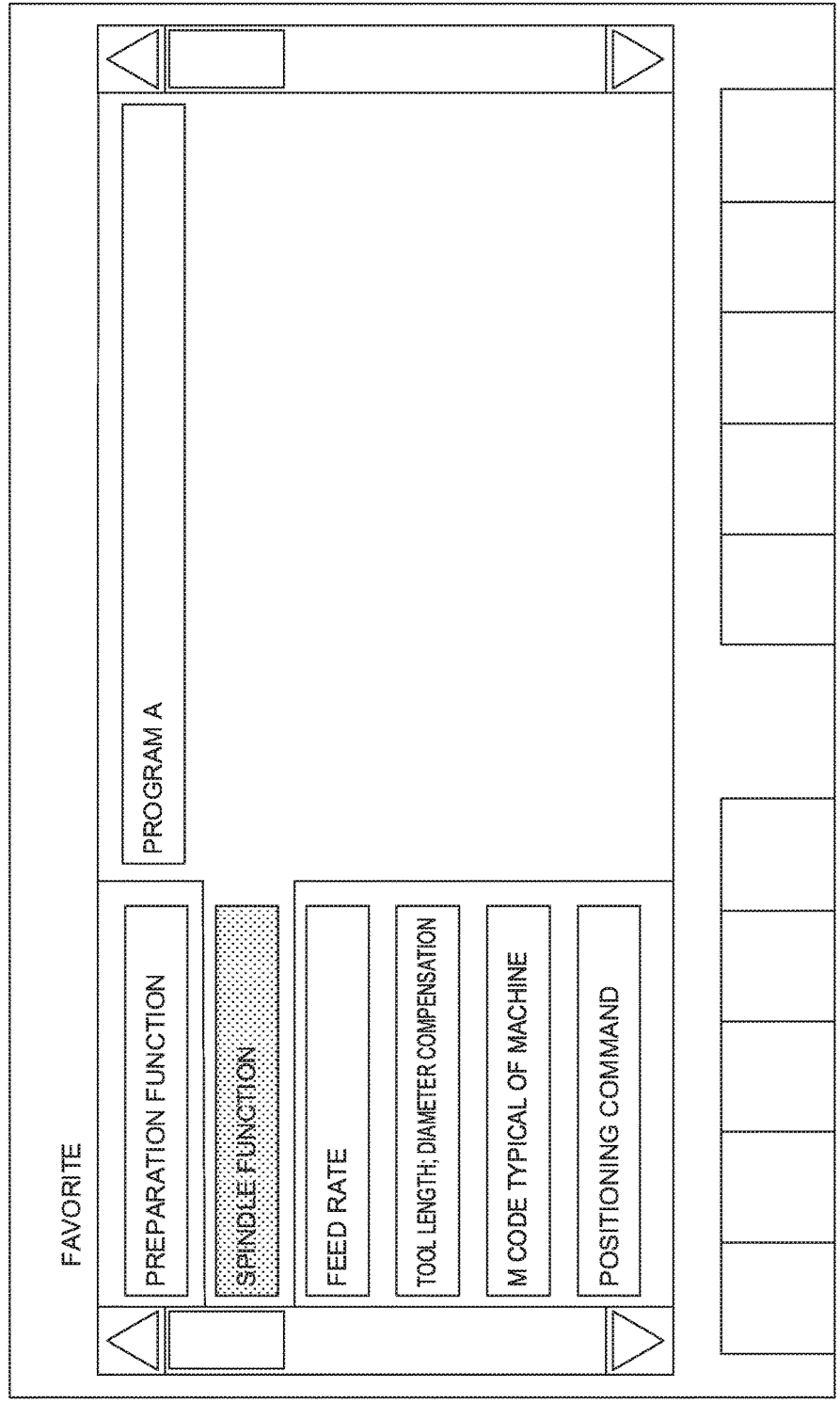

INFORMATION PROCESSOR

RELATED APPLICATIONS

The present application claims priority to Japanese Patent Application No. 2016-193077 filed on Sep. 30, 2016, the disclosure of which is hereby incorporated by reference herein in its entirety.

BACKGROUND OF THE INVENTION

1. Field of the Invention

The present invention relates to information processors, and particularly to an information processor capable of automatically classifying programs used in numerical controllers connected to the information processor.

2. Description of the Related Art

Japanese Patent Application Laid-Open No. 2004-145641 discloses a system that collects programs used in all numerical controllers connected to a server, and displays a list of the programs on the respective numerical controllers, so that a user can select and execute any one of the programs, as shown in FIG. 10. According to the system, the user can transfer and save programs to the host computer by operating the respective numerical controllers, obtain a list of the saved programs from the host computer to dis lay the list on operating screens of the respective numerical controllers, and move a cursor to select a desired program to be output so as to execute the selected program.

FIG. 11 is a diagram showing a process in which the user using the system disclosed in Japanese Patent Application. Laid-Open No. 2004-145641 searches a desired program from a plurality of programs stored in the host computer.

The user has to sequentially browse the contents of the programs from the top in the list stored in the host computer to select a target program. FIG. 11 shows the case in which the fourth program is the target program and the user can find the program through the four browsing steps. However, as the number of programs stored in the host computer increases, the number of programs that the user has to browse also greatly increases, which may lead to a decrease in operating efficiency. As the number of numerical controllers connected to the host computer increases, the problem of the low operating efficiency is more serious when the programs used in the respective numerical controllers are transferred and stored in the host computer as disclosed in Japanese Patent Application Laid-Open No. 2004-145641.

SUMMARY OF THE INVENTION

It is therefore an object of the present invention to provide an information processor which allows a user to easily search a desired program from saved programs.

According to the present invention, the information processor such as a cell controller or a host computer has function to automatically collect a plurality of programs used in numerical controllers to be managed, count the number of times the respective programs are executed in each numerical controller, and automatically record programs that have been executed predetermined times or more as favorite programs. The information processor of the present invention further automatically classifies the programs recorded as favorite programs according to the contents thereof. These functions solve the conventional problem described above.

An information processor according to the present invention manages at least one numerical controller and include:
a program storage unit configured to store one or more programs executable by the numerical controller; an execution history storage unit configured to store execution history information of a program executed by the numerical controller; a favorite storage unit configured to store, as favorite information, information about a program corresponding to a predetermined favorite condition among the programs; a program management unit configured to create the execution history information according to information about the program executed by the numerical controller and store the created execution history information in the execution history storage unit; a favorite recording unit configured to record, in the favorite storage unit, the information about the program corresponding to the favorite condition, as the favorite information, according to the execution history information stored in the execution history storage unit; and a favorite classifying unit configured to classify the favorite information stored in the favorite storage unit according to the information about the program corresponding to the favorite information. The program management unit transfers the favorite information stored in the favorite storage unit to the numerical controller in response to a request of the numerical controller.

The favorite condition may be defined such that the number of times a program is executed exceeds a predetermined number; and the favorite recording unit may add up the number of times each program is executed on the basis of the execution history information stored in the execution history storage unit, and record the information about the program of which the number of times executed exceeds the predetermined number as the favorite information.

The favorite condition may be defined such that an execution frequency within a most recent predetermined period exceeds a predetermined value; and the favorite recording unit may add up the execution frequency of each program within the most recent period according to the execution history information stored in the execution history storage unit, and record, as favorite information, the information about the program of which the execution frequency exceeds the predetermined value, in the favorite storage unit to record.

The information processor may further include a classification table for storing classifications of the respective programs in association with codes used for the programs belonging to the classifications, and the favorite classifying unit may classify the favorite information stored in the favorite storage unit according to a content of the program corresponding to the favorite information with reference to the classification table.

The execution history information may include pieces of information about the numerical controller by which the program is executed; and the favorite recording unit may record, as the favorite information, the information about the program corresponding to the favorite condition, for each piece of information about the numerical controller in the favorite storage unit.

The execution history information may include pieces of information about a machine controlled by the numerical controller by which the program is executed; and the favorite recording unit may record, as the favorite information, the information about the program corresponding to the favorite condition, for each piece of information about the machine in the favorite storage unit.

According to the present invention, the user can easily recognize frequently-used programs stored in the information processor by referring to a list of classifications corresponding to the programs, so as to greatly save the user the trouble of searching a desired program.

BRIEF DESCRIPTION OF THE DRAWINGS

FIG. 1 is a diagram showing an entire configuration of the present invention.

FIG. 2A and FIG. 2B are diagrams for explaining an automatic record function and an automatic classifying function according to the present invention.

FIG. 6A and FIG. 6B are diagrams illustrating a favorite storage unit in the cell controller shown in FIG. 3 and favorite information stored in the favorite storage unit.

FIG. 7 is an example of a classification table according to the embodiment of the present invention.

FIG. 9A is an example of a conventional program list display screen, and FIG. 9B is an example of a favorite display screen displayed on a favorite display unit in the numerical controller shown in FIG. 3.

DETAILED DESCRIPTION OF THE PREFERRED EMBODIMENTS

Hereinafter, an embodiment of the present invention will be described with reference to the drawings. The same or similar elements as in the conventional system will be described with the same symbols indicated.

FIG. 1 is a diagram showing the entire configuration of the present invention. The following embodiment illustrates a cell controller used as an information processor of the present invention.

The cell controller is used and placed typically in a manufacturing cell to manage a plurality of machines (numerically controlled machines such as a machining center, a small-sized lathe, and a large-sized 5-axis machine, robots, and other machines involved in cellular manufacturing) so as to instruct the machines to process products in accordance with instructions issued by a host computer (not shown). The cell controller includes a storage unit for storing programs used in the machines so as to provide the programs to the respective machines through communication paths. While the cell controller automatically transfers a program to a machine to process products, a user may request a program from the cell controller by operating a control panel or the like of a machine to transfer the program to the machine.

The cell controller 1 serving as the information processor of the present invention has an automatic record function to count the number of times the respective programs are executed in each numerical controller, and automatically record programs that have been executed predetermined times or more as favorite programs. The cell controller 1 also has an automatic classifying function to automatically classify the programs recorded as favorite programs according to the contents thereof. Examples of programs stored in the cell controller 1 include programs transferred from the host computer (not shown) and programs used in machines to be managed (including machining programs and MDI programs input into the machines by the user) and collected automatically.

FIG. 2A and FIG. 2B are diagrams illustrating the automatic record function (FIG. 2A) and the automatic classifying function (FIG. 2B) included in the cell controller 1 of the present invention.

The cell controller 1 includes the automatic record function (FIG. 2A) to automatically record frequently-used programs as "Favorites" based on an execution history of the respective stored programs, and the automatic classifying function (FIG. 2B) to automatically classify the programs recorded as "Favorites" according to the contents thereof. The automatic record function allows the user to simply browse the frequently-used programs recorded as "Favorites" upon referring to the history of the executed programs, so as to improve a degree of accuracy in finding a target program to some extent. The user can further narrow down the programs in "Favorites" as necessary by selecting classified items, in order to greatly save the user the trouble of searching a desired program from the history.

Figure 3:
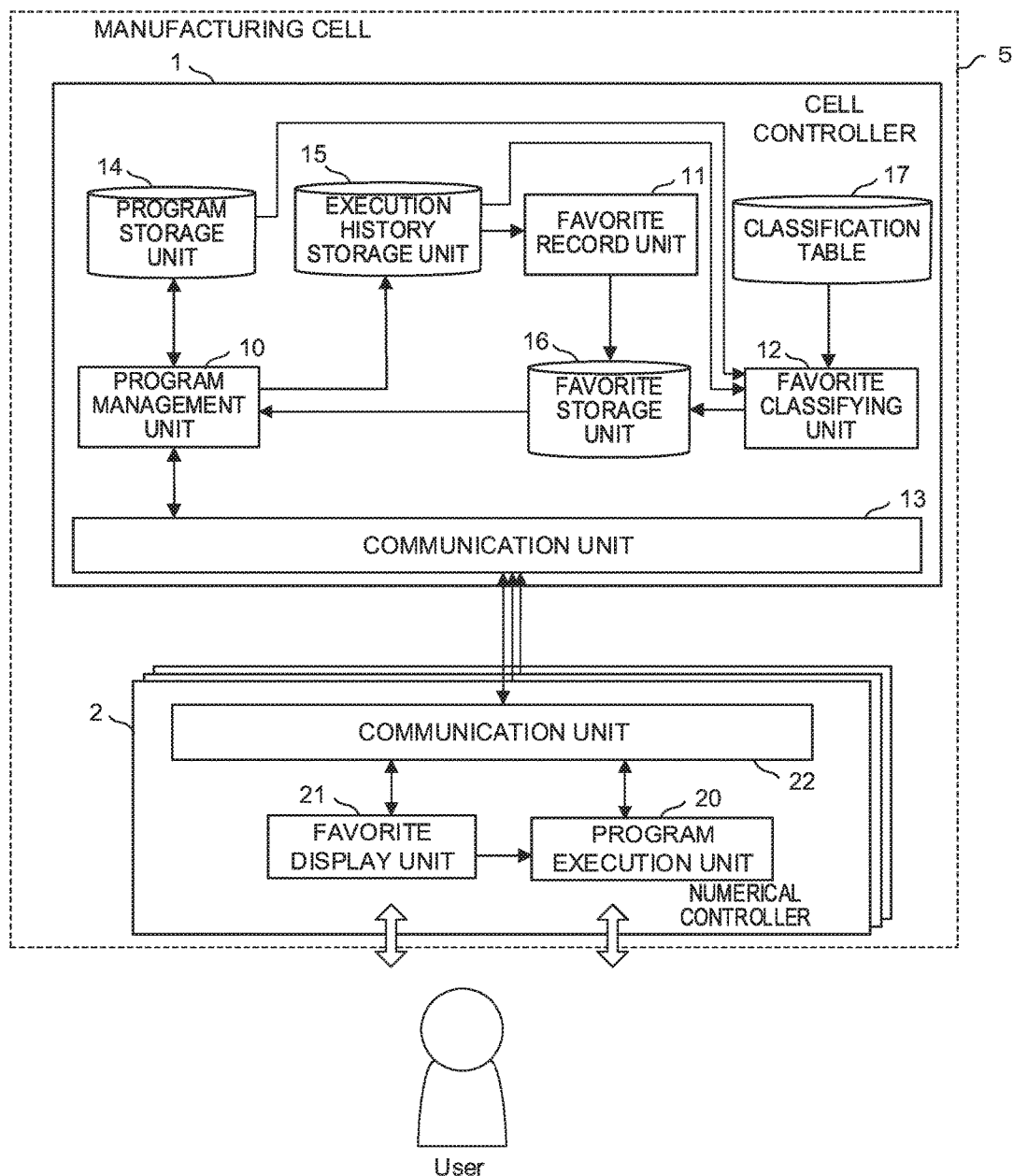
FIG. 3 is a functional block diagram showing a cell controller and numerical controllers according to an embodiment of the present invention.

FIG. 3 is a functional block diagram showing the numerical controllers according to the embodiment of the present invention.

The cell controller 1 according to the present embodiment is placed in the manufacturing cell 5 and connected with a plurality of numerical controllers 2 via communication lines. The cell controller 1 includes a program management unit 10, a favorite record unit 11, a favorite classifying unit 12, and a communication unit 13. The cell controller 1 further includes, in memory (not shown), a program storage unit 14, an execution history storage unit 15, a favorite storage unit 16, and a classification table 17.

The program management unit 10 manages communications of information about programs with the respective numerical controllers 2 through the communication unit 13. The program management unit 10 instructs the numerical controllers 2 to execute programs stored in the program storage unit 14 and transferred in accordance with the instructions issued by the host computer (not shown), or transfers programs stored in the program storage unit 14 to the numerical controllers 2 in response to requests of the numerical controllers 2. The program management unit 10 also stores programs transferred from the host computer in the program storage unit 14, or collects programs input to the numerical controllers 2 through the communication unit 13 to store the programs in the program storage unit 14. In this case, the program management unit 10 stores the respective programs in the program storage unit 14 in association with identification information so as to identify each program.

Figure 4:
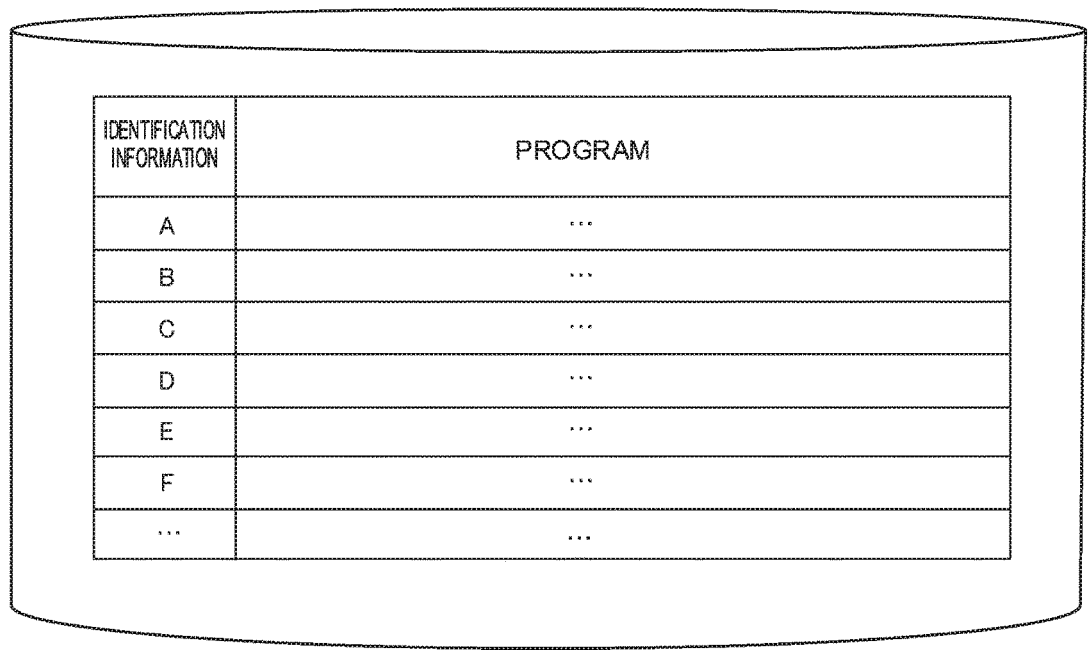
FIG. 4 is a diagram showing an example of a program storage unit in the embodiment of the present invention.

FIG. 4 is a diagram illustrating programs stored in the program storage unit 14.

The program storage unit 14 stores a plurality of programs. The respective programs are stored in association with identification information in the program storage unit 14 so that each program is identified uniquely. The programs maybe stored in the program storage unit 14 in association with information indicating characteristics of the respective programs (such as a programmer and a summary of operating contents).

The program management unit 10 collects execution history information of each program in the numerical controllers 2 through the communication unit 13 and stores the collected information in the execution history storage unit 15.

Figure 5:
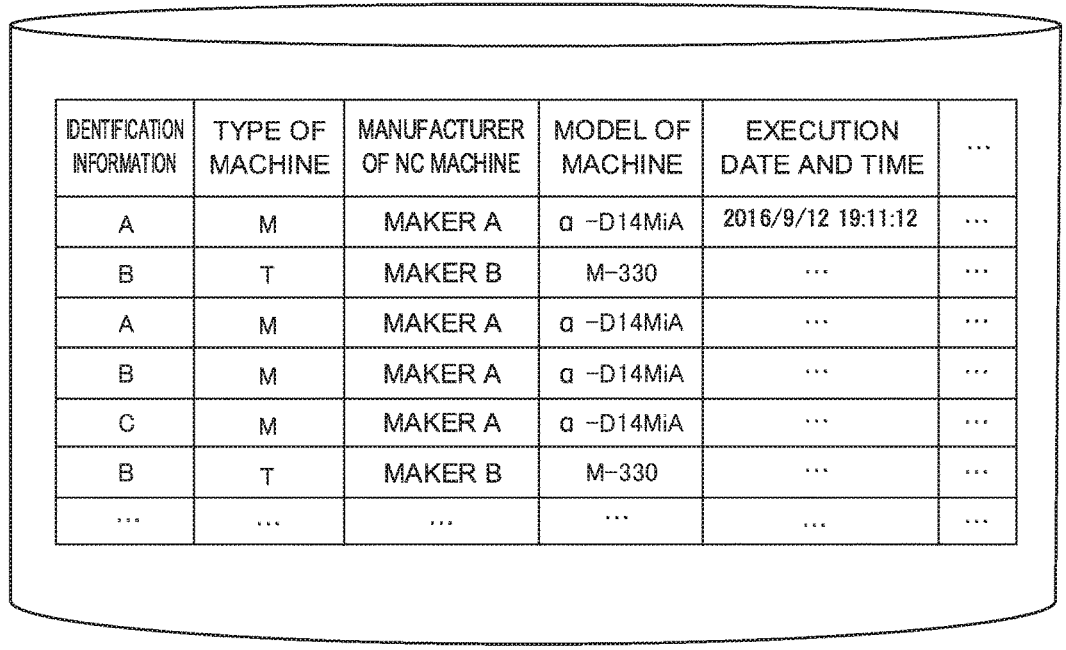
FIG. 5 is a diagram showing an example of an execution history storage unit and execution history information in the embodiment of the present invention.

FIG. 5 is a diagram illustrating the execution history information stored in the execution history storage unit 15.

The execution history storage unit 15 stores a plurality of pieces of execution history information. The execution history information stored includes at least the identification information of each program and denotes that the program stored in the program storage unit 14 and associated with the identification information has been executed. The execution history information may include the date and time of execution of each program corresponding to the identification information. The execution history information may also include a type of a machine (such as a machining center, a lathe, and a compound machine tool) by which a program was executed, a manufacturer of the numerical controller by which a program was executed, a model of a machine by which a program is executed, and an operator who operated the numerical controller.

When a program execution unit 20 included in each numerical controller 2 executes a program, the program management unit 10 acquires, from the corresponding numerical controller 2, the program executed and each piece of information about the program to be stored as execution history information. When the same program as the program acquired from the numerical controller 2 has already been stored in the program storage unit 14, the program management unit 10 creates the execution history information based on the identification information corresponding to the program and each piece of the information acquired from the numerical controller 2, and stores the created execution history information in the execution history storage unit 15. When the program acquired from the numerical controller 2 is not yet stored in the program storage unit 14, the program management unit 10 creates new identification information about the program and stores the information in the program storage unit 14, creates the execution history information based on the new identification information and each piece of the information acquired from the numerical controller 2, and store the created execution history information in the execution history storage unit 15.

In the case in which the program management unit 10 determines whether the same program as the program acquired from the numerical controller 2 has already been stored in the program storage unit 14, addresses in which values such as coordinate values vary may be considered to be the same address (accordingly, for example, a program "G00X100;" and a program "G00X0;" may be considered to be the same program). When the program execution unit 20 included in each numerical controller 2 executes the program transferred from the program management unit 10, the program management unit 10 does not necessarily acquire the program from the numerical controller 2, but is only required to acquire the identification information of the program executed.

The program management unit 10 provides, in response to requests from the numerical controller 2, information about "Favorites" stored in the favorite storage unit 16 described below and classification information of "Favorites" to the numerical controllers 2 through the communication unit 13.

The favorite record unit 11 refers to the execution history storage unit 15, count s the number of times a program is executed on the basis of the identification information of the respective programs included in the execution history information stored in the execution history storage unit 15, and executes automatic record processing of recording the information about the programs that have been executed more than predetermined times in the favorite storage unit 16 as favorite information. The automatic record processing may be executed with respect to the entire execution history information stored in the execution history storage unit 15 at a predetermined point of time (such as start-up of the cell controller or every hour), or may be executed every time the program management unit 10 stores the execution history information.

Figure 6B:
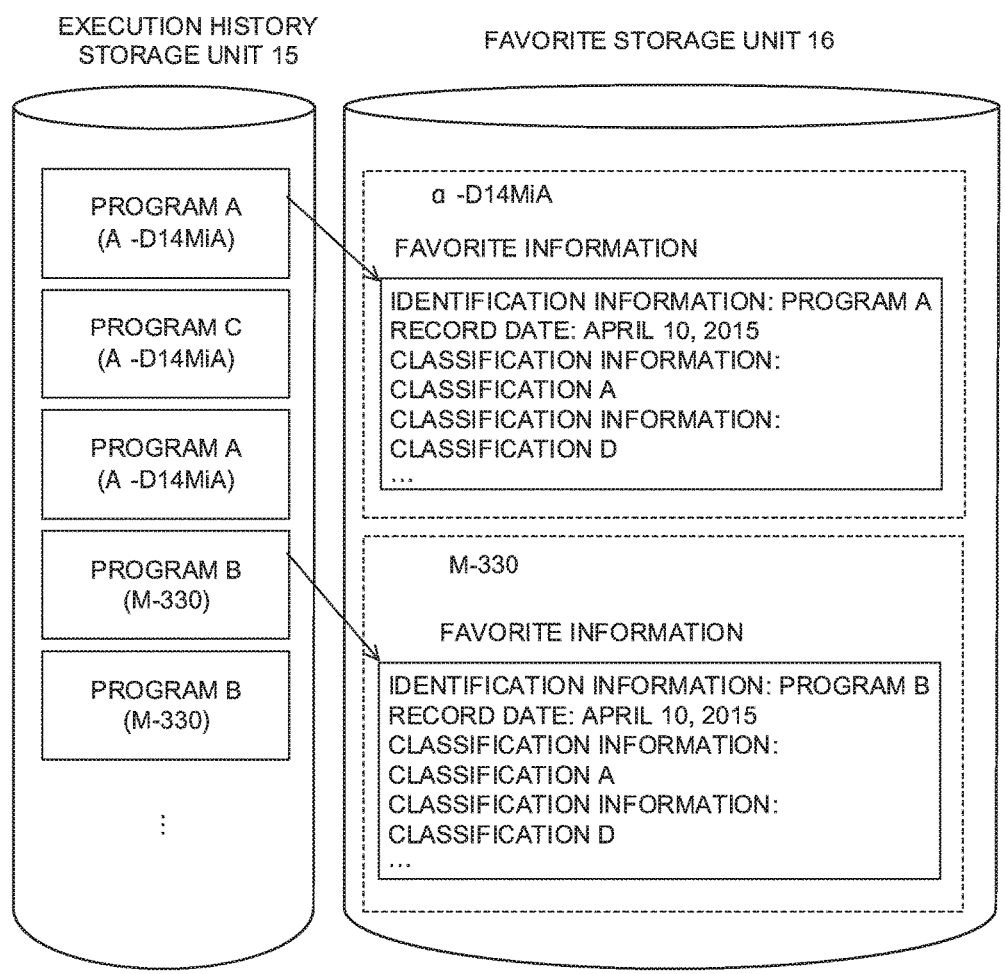

FIG. 6A and FIG. 6B are diagrams illustrating favorite information stored in the favorite storage unit 16.

The favorite storage unit 16 stores multiple pieces of favorite information. As shown in FIG. 6A, the favorite information includes at least the identification information and the classification information of each program, and may further include information about the date and time of records so as to manage each favorite information recorded. As shown in FIG. 6B, the number of times each program stored as "Favorites" is executed may be counted for each piece of information, such as a type of a machine, a manufacturer of the numerical controller, and a model of a machine, included in the execution history information stored in the execution history storage unit 15, so as to record the favorite information in the favorite storage unit 16 in association with the respective pieces of the information. Accordingly, the most suitable favorite information can be transferred (a program having been executed most in a specific machine or the numerical controller 2 can be transferred) to a favorite display unit 21 of the target numerical controller 2 or a machine controlled by the numerical controller 2 when a request for favorite information is made from the favorite display unit 21 afterward, based on the information about the type and model of the machine controlled by the numerical controller 2, the manufacturer of the numerical controller 2, and the like. The classification information indicates classifications the favorite classifying unit 12 described below applies to favorite information through automatic classifying processing, and a plurality of classifications can be applied to each program recorded as favorite information. The favorite classifying unit 12 carries out automated classifications processing which determines a classification to be applied to the program based on identification information of the program included in the favorite information recorded in the favorite storage unit 16, the contents of the program body stored in the program storage unit 14 corresponding to the identification information, the execution history information stored in the execution history storage unit 15, and the classification table 17 and which provides the determined classification to the favorite information as the classification information.

FIG. 7 is an example of the classification table 17.

The classification table 17 is used for classifying programs with codes, and includes classified contents associated with the classification codes, as shown in FIG. 7.

The favorite classifying unit 12 refers to the classification table 17 to extract a classification corresponding to a classification code included in a program recorded as favorite information and apply the extracted classification to the favorite information as the classification information. In the classification table 17 used for classifying programs, the classification codes associated with the classifications may specifically be defined by use of character strings included in comments described in programs, and regular expressions or logical expressions matching a series of block expressions, for example. The classification using the classification table 17 is effective in classifying short programs such as MDI programs.

Instead of the use of the classification table 17, the favorite classifying unit 12 may classify programs by common analyzing methods, such as extraction of characteristic phrases from explanations in comments described in programs (from descriptions such as objects of programs), analysis of flows of command blocks, and analysis and extraction of characteristic command blocks.

Figure 8:
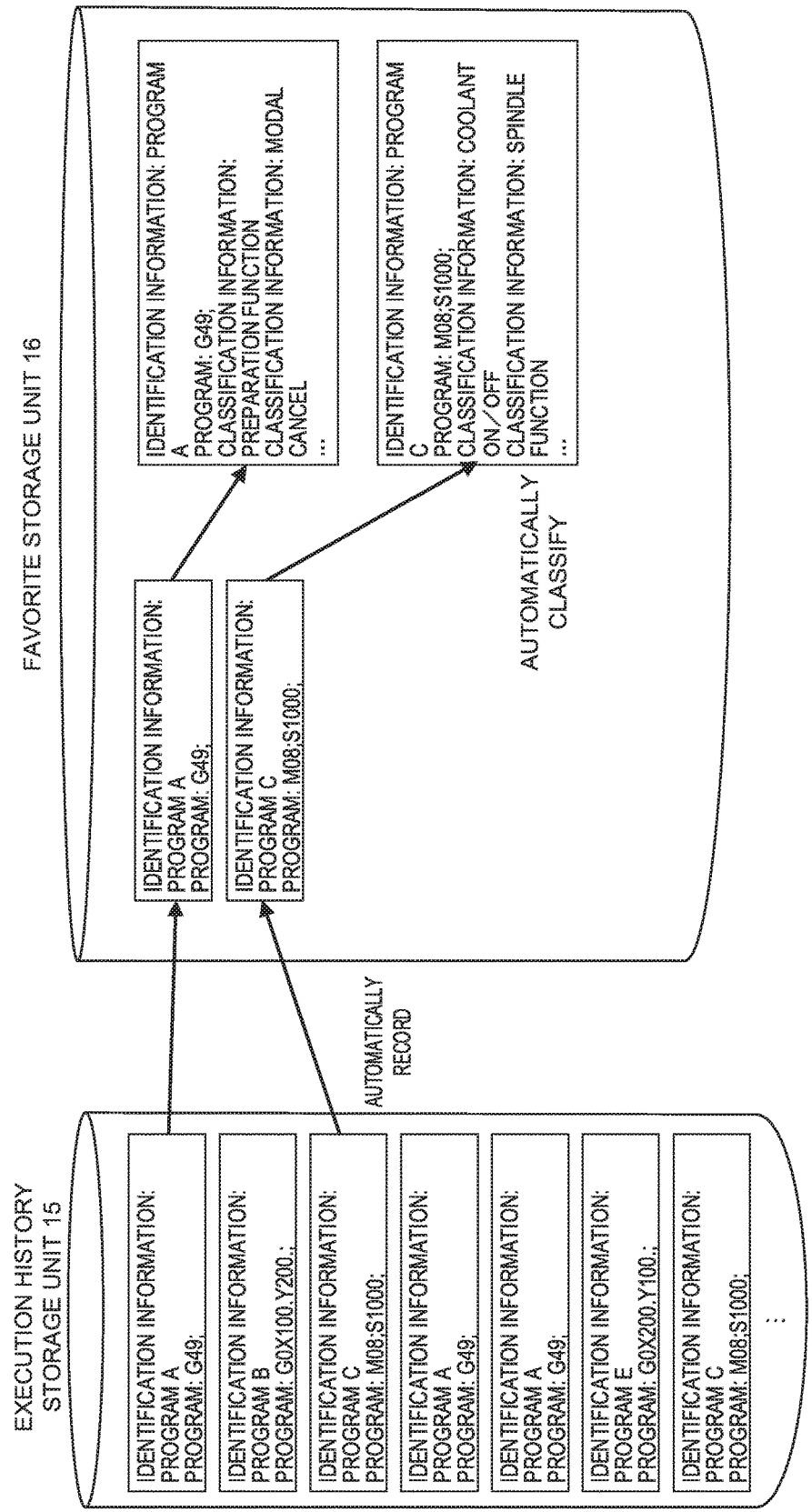
FIG. 8 is a diagram illustrating automatic record processing and automatic classifying processing according to the embodiment of the present invention.
Figure 10:
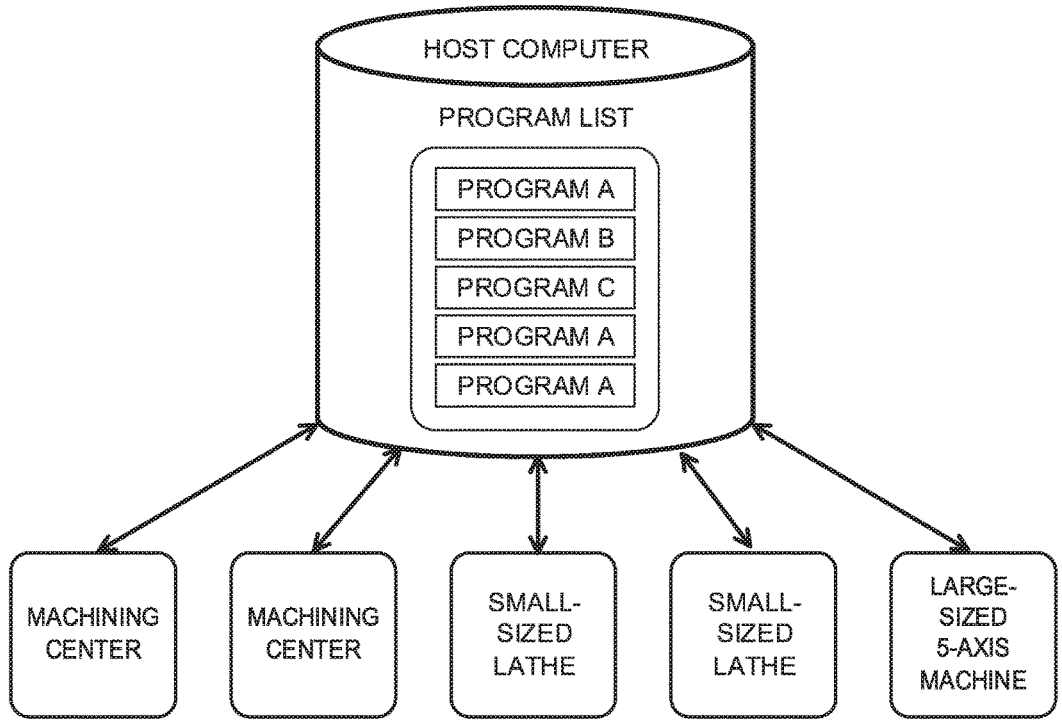
FIG. 10 is a diagram for explaining a method of managing programs by a host computer in a conventional system.
Figure 11:
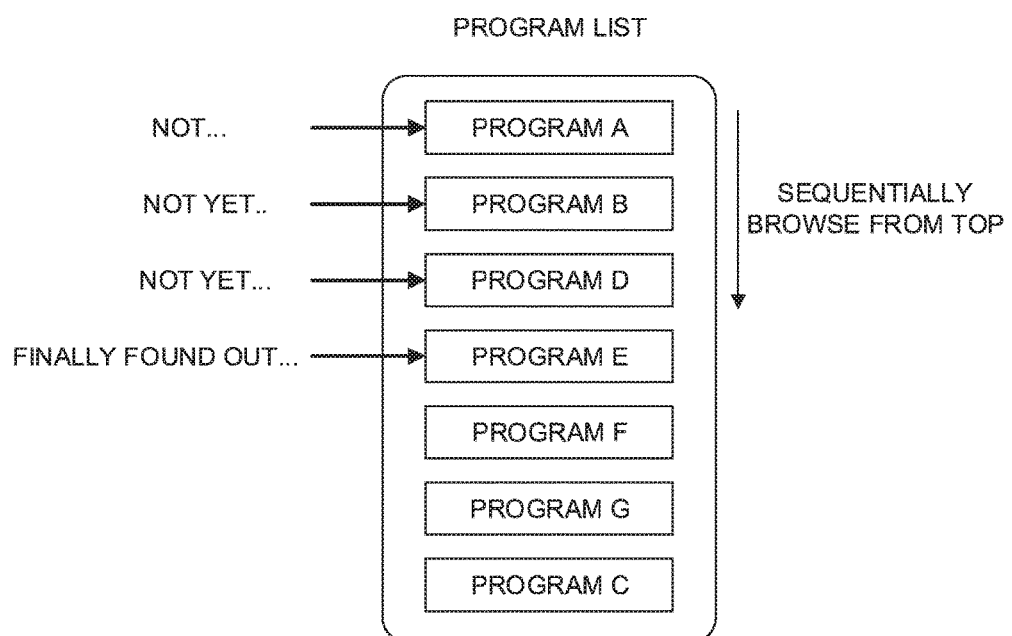
FIG. 11 is a diagram for explaining a process of searching a target program from an execution history in the conventional system.

FIG. 8 is a diagram showing specific examples of the automatic record processing of recording "Favorites" executed by the favorite recording unit 11 and the automatic classifying processing executed by the favorite classifying unit 12. FIG. 8 illustrates the respective programs together with the execution history information and the favorite information for illustration purposes.

FIG. 8 shows a case in which a predetermined number or more of programs "G49," labeled "Program A" and programs "M08; S1000;" labeled "Program C" are stored in the execution history storage unit 15. The favorite recording unit 11 extracts information about. Program A and Program C from the execution history storage unit 15, creates favorite information of each program, and automatically records the favorite information in the favorite storage unit 16. The favorite classifying unit 12 determines with reference to the classification table 17 that the program "G49;" labeled "Program A" belongs to the classifications "Preparation Function" and "Modal Cancel", and applies these classifications to the favorite information as classification information. The favorite classifying unit 12 determines with reference to the classification table 17 that the program "M08; S1000;" labeled "Program C" belongs to the classifications "Coolant ON/OFF" and "Spindle Speed Function", and applies these classifications to the favorite information as classification information.

As shown in FIG. 3, the numerical controller 2 includes the program execution unit 20, the favorite display unit 21, and a communication unit 22.

The program execution unit 20 executes a program transferred from the cell controller 1 through the communication units 13 and 22 or a program input via a display/MDI unit (not shown) by the user, and controls a target machine with the program. Examples of programs transferred from the cell controller 1 include a program requested by the cell controller 1 in accordance with instructions issued by the host computer, and a program selected by the user via the favorite display unit 21 described below. The programs transferred from the cell controller 1 may include the identification information of the respective programs.

The program execution unit 20 transfers information about a program executed (such as identification information of a program and information about the numerical controller 2 or a machine to be controlled) as an execution history to the cell controller 1 through the communion unit 22 when executing the program or in response to a request from the cell controller 1.

The favorite display unit 21 requests the program management unit 10 of the cell controller 1 to transfer a list of favorite information stored in the favorite storage unit 16 through the communication unit 22 in accordance with a command of the user, and displays the list of the favorite information transferred from the cell controller 1 on the display/MDI unit (not shown) in the numerical controller 2. The favorite display unit 21 also requests the cell controller 1 to transfer a program corresponding to favorite information selected by the user from the list of the favorite information displayed, so that the program transferred from the cell controller 1 in response to the request is output to the program execution unit 20.

The favorite display unit 21 displays the list of the favorite information transferred from the cell controller 1 for each classification selected by the user. When the favorite display unit 21 requests the cell controller 1 to transfer the favorite information, the favorite display unit 21 may send to the cell controller 1 the classification information and other information about a manufacturer of the numerical controller 2, and information such as a type and model of a machine to be controlled and a user name, for example. The program management unit 10 of the cell controller 1 may transfer the favorite information further narrowed down according to the information included in the request of the favorite display unit 21.

FIG. 9A is an example of a conventional program list display screen, and FIG. 9B is an example of a favorite display screen displayed on the favorite display unit 21 according to the present embodiment.

As shown in FIG. 9A, since the conventional display screen merely indicates a list of information about programs transferred, the user may have the trouble of searching a desired program. On the other hand, the favorite display screen displayed on the favorite display unit 21 of the present embodiment displays only frequently-used programs, and the user selects one of classifications listed on the left of the screen to display a program to which the selected classification is applied on the right of the screen, as shown in FIG. 9B, so as to greatly save the user the trouble of searching a desired program.

While the embodiment of the present invention has been described above, it should be understood that the present invention is not intended to be limited to the examples of the embodiment, and the present invention may be modified as appropriate and applicable to various modes.

For example, the respective functional means have individually been described in the embodiment above, but may be integrated with other means or divided into smaller units as appropriate. For example, the division of the program management unit 10 into separate functional means of communicating programs and acquiring an execution history does not impair the functions necessary for the present invention.

The data structure of each of the information stored in the program storage unit 14, the execution history information stored in the execution history storage unit 15, and the favorite information stored in the favorite storage unit 16 may be designed variously.

The present embodiment has exemplified the case of using the cell controller as the information processor of the present invention, but may use a common computer or a host computer connected with the respective numerical controllers via a network, a production planning machine, or a server located in a manufacturer each equipped with the automatic record function and the automatic classifying function described in the present invention so as to serve as the information processor of the present invention. Alternatively, one of numerical controllers connected via a network may be equipped with those functions so as to serve as the information processor of the present invention.

Although the present embodiment has exemplified the case of recording programs as "Favorites" in the favorite recording unit 16 depending on the number of times a program is executed, the condition of recording programs in the favorite register is not limited merely to the number of times a program is executed, and programs to be recorded as "Favorites" may be determined according to the execution frequency within a predetermined period (such as the number of times a program is executed in the most recent week). Alternatively, each of users executing programs may be evaluated by weighting (such as weighting depending on the level of skill of each user), and the weight may be added up every time each user executes a particular program to count the score, so as to record the corresponding program as Favorites" when the score exceeds a predetermined value.

The classification may be made by providing a register for storing classification information and storing identification information of each program in the register, instead of application of the classification information as described in the embodiment above.

The favorite display screen on the favorite display unit 21 may employ any displaying method without impairing the effects of the present invention, such as a method of switching between the conventional execution history display screen and the favorite display screen of the present invention.

What is claimed is:

1. An information processor for managing at least one numerical controller, the information processor comprising:
    a program storage unit configured to automatically store one or more programs executable by the numerical controller;
    an execution history storage unit configured to store execution history information of a program executed by the numerical controller;
    a favorite storage unit configured to automatically store, as favorite information, information about a program corresponding to a predetermined favorite condition among the programs;
    a program management unit configured to create the execution history information according to information about the program executed by the numerical controller and store the created execution history information in the execution history storage unit;
    a favorite recording unit configured to record, in the favorite storage unit, the information about the program corresponding to the favorite condition, as the favorite information, according to the execution history information stored in the execution history storage unit; and
    a favorite classifying unit configured to automatically classify the favorite information stored in the favorite storage unit according to the information about the program corresponding to the favorite information, wherein
    the program management unit transfers the favorite information stored in the favorite storage unit to the numerical controller in response to a request of the numerical controller.

2. An information processor for managing at least one numerical controller, the information processor comprising:
    a program storage unit configured to store one or more programs executable by the numerical controller;
    an execution history storage unit configured to store execution history information of a program executed by the numerical controller;
    a favorite storage unit configured to store, as favorite information, information about a program corresponding to a predetermined favorite condition among the programs;
    a program management unit configured to create the execution history information according to information about the program executed by the numerical controller and store the created execution history information in the execution history storage unit;
    a favorite recording unit configured to record, in the favorite storage unit, the information about the program corresponding to the favorite condition, as the favorite information, according to the execution history information stored in the execution history storage unit; and
    a favorite classifying unit configured to classify the favorite information stored in the favorite storage unit according to the information about the program corresponding to the favorite information, wherein
    the program management unit transfers the favorite information stored in the favorite storage unit to the numerical controller in response to a request of the numerical controller,
    the favorite condition is defined such that the number of times a program is executed exceeds a predetermined number, and
    the favorite recording unit adds up the number of times each program is executed on the basis of the execution history information stored in the execution history storage unit, and records the information about the program of which the number of times executed exceeds the predetermined number as the favorite information.

3. An information processor for managing at least one numerical controller, the information processor comprising:
    a program storage unit configured to store one or more programs executable by the numerical controller;
    an execution history storage unit configured to store execution history information of a program executed by the numerical controller;
    a favorite storage unit configured to store, as favorite information, information about a program corresponding to a predetermined favorite condition among the programs;
    a program management unit configured to create the execution history information according to information about the program executed by the numerical controller and store the created execution history information in the execution history storage unit;
    a favorite recording unit configured to record, in the favorite storage unit, the information about the program corresponding to the favorite condition, as the favorite information, according to the execution history information stored in the execution history storage unit; and
    a favorite classifying unit configured to classify the favorite information stored in the favorite storage unit according to the information about the program corresponding to the favorite information, wherein
    the program management unit transfers the favorite information stored in the favorite storage unit to the numerical controller in response to a request of the numerical controller,
    the favorite condition is defined such that an execution frequency within a most recent predetermined period exceeds a predetermined value, and
    the favorite recording unit adds up the execution frequency of each program within the most recent period according to the execution history information stored in the execution history storage unit, and records, as favorite information, the information about the program of which the execution frequency exceeds the predetermined value, in the favorite storage unit to record.

4. An information processor for managing at least one numerical controller, the information processor comprising:

a program storage unit configured to store one or more programs executable by the numerical controller;

an execution history storage unit configured to store execution history information of a program executed by the numerical controller;

a favorite storage unit configured to store, as favorite information, information about a program corresponding to a predetermined favorite condition among the programs;

a program management unit configured to create the execution history information according to information about the program executed by the numerical controller and store the created execution history information in the execution history storage unit;

a favorite recording unit configured to record, in the favorite storage unit, the information about the program corresponding to the favorite condition, as the favorite information, according to the execution history information stored in the execution history storage unit; and a favorite classifying unit configured to classify the favorite information stored in the favorite storage unit according to the information about the program corresponding to the favorite information, wherein the program management unit transfers the favorite information stored in the favorite storage unit to the numerical controller in response to a request of the numerical controller, the information processor further comprises a classification table for storing classifications of the respective programs in association with codes used for the programs belonging to the classifications, and the favorite classifying unit classifies the favorite information stored in the favorite storage unit according to a content of the program corresponding to the favorite information with reference to the classification table.

5. The information processor according to claim 1, wherein:

the execution history information includes pieces of information about the numerical controller by which the program is executed; and the favorite recording unit records, as the favorite information, the information about the program corresponding to the favorite condition, for each piece of information about the numerical controller in the favorite storage unit.

6. The information processor according to claim 1, wherein:

the execution history information includes pieces of information about a machine controlled by the numerical controller by which the program is executed; and the favorite recording unit records, as the favorite information, the information about the program corresponding to the favorite condition, for each piece of information about the machine in the favorite storage unit.

* * * * *